Nov. 11, 1958 W. E. EMLEY, JR 2,859,987
INFLATABLE SEAL FOR RELATIVELY SLIDING SURFACES
Filed Feb. 21, 1957

INVENTOR.
WARREN E. EMLEY JR.
BY
ATTORNEYS

United States Patent Office 2,859,987
Patented Nov. 11, 1958

2,859,987

INFLATABLE SEAL FOR RELATIVELY SLIDING SURFACES

Warren E. Emley, Jr., Berea, Ohio, assignor to the United States of America as represented by the Secretary of the Navy Application February 21, 1957, Serial No. 641,785

3 Claims. (Cl. 286—26)

(Granted under Title 35, U. S. Code (1952), sec. 266)

The invention described herein may be manufactured and used by or for the Government of the United States of America for governmental purposes without the payment of any royalties thereon or therefor.

The present invention relates to sealing devices and more particularly to a device for making a seal between two relatively movable surfaces wherein the distance between the two surfaces is variable.

Although there are numerous sealing devices known in the art for providing airtight seals between two relatively movable surfaces, none are suitable for use in making a pressure-tight seal between the vertical sidewalls and the horizontal top and bottom plates of an adjustable supersonic wind tunnel nozzle. The high temperatures and velocities obtained inside a wind tunnel present a most difficult sealing problem. Heretofore, one method employed in making seals between the sidewalls and horizontal plates consisted of placing an extrusion of resilient material, such as rubber, in a suitable groove provided in the vertical plate. The extrusion was compressed at installation so that a seal was provided. However, due to the high temperatures and velocities involved, the sealing material would soon flow or harden and lose its elasticity, and consequently no longer provide an adequate seal.

The invention disclosed herein provides a most satisfactory seal for use in sealing sliding surfaces, such as are found in wind tunnel constructions, by providing a seal assembly comprised of an inflatable, flexible hose surmounted on an extruded labyrinth-type seal made from a heat resistant material. The flexible hose is inflated with circulating water which not only keeps the hose cool and resilient, but serves as an expanding force within the hose to provide the necessary pressure required in making a seal. The labyrinth is supplied with filtered dry air under pressure which provides a buffer zone to insure positive sealing.

It is therefore a general object of the present invention to provide a sealing device between two relatively movable surfaces.

Another object is to provide an improved sealing device for use in supersonic wind tunnels wherein high temperatures are involved.

Other objects and many of the attendant advantages of this invention will be readily appreciated as the same becomes better understood by reference to the following detailed description when considered in connection with the accompanying drawing wherein.

Figure 1:
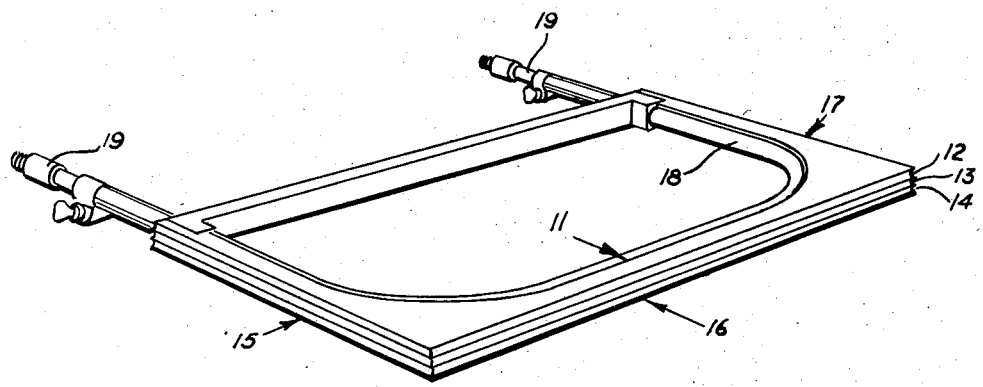
Figure 1 is a perspective view of one embodiment of the invention.

Referring now to the drawing, wherein like reference characters designate like or corresponding parts throughout the several views, there is shown in Figure 1 a sealing device comprised of a labyrinth seal 11 of resilient heat resistant material, having grooves 12, 13, and 14 therein. The labyrinth seal is preferably, though not necessarily, extruded and, as shown for purposes of illustration, is substantially rectangular in section for providing sealing along three faces 15, 16, and 17. A flexible hose 18, elliptical in cross-section, is provided adjacent the inner surface of the labyrinth seal and is provided with the necessary pipe connections 19 so that it may be connected to a supply of water.

Figure 2:
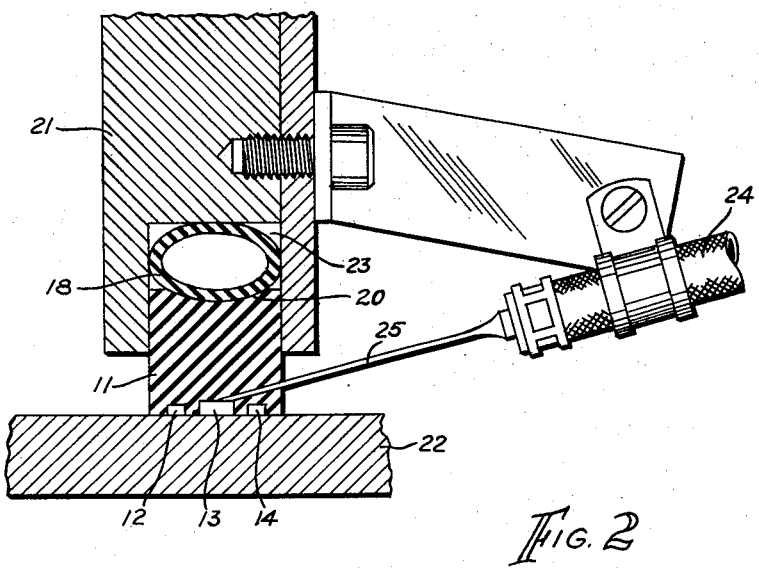
Figure 2 is a sectional view showing a sealing device in position.

Referring now to Figure 2 of the drawing, there is shown a sealing device in position for providing an airtight seal between vertical plate 21 and horizontal plate 22. Vertical plate 21 is provided with a seal groove 23 that is substantially of the same width as the major axis of the elliptical hose 18. The labyrinth seal 11 likewise is a snug fit within seal groove 23, and the labyrinth seal 11 has a contour 20 that accommodates the hose 18 to provide a seat therefor.

The labyrinth seal 11 is shown having grooves 12, 13, and 14 opposed to the horizontal plate 22 and consequently closed passageways are provided thereby. Dry air under pressure is supplied to the large passageway 13 by any suitable means, such as an air hose 24 and a hypodermic needle 25. It is thus possible to keep the pressure of the passageway 13 at a greater pressure than either the outside pressure or the pressure within a wind tunnel that is being sealed. Any flow of air due to imperfect sealing will be from passageway 13 into either the wind tunnel or to the outside. The use of a plurality of passageways permits a better seal in that the surface is made more flexible and small particles of dirt or other foreign matter cannot prevent adequate sealing.

After the hose 18 and the labyrinth seal 11 have been positioned within the seal groove 23, water or other fluids are supplied through the hose 18 and the pressure therein moves the seal 11 in the groove 23 towards the surface of plate 22 to provide an airtight seal. Filtered dry air is then injected in passageway 13 until the air pressure within the passageway exceeds the pressure on either side of the seal assembly. The desired water pressure is obtained by throttling the water discharge, and the flowing water serves both as a pressure and a cooling means.

It may be desirable to mold the corners of the labyrinth seal to an angle slightly less than 90 degrees, and the seal groove 23 can be provided with a radius at the corner compatible with the inflating hose characteristics so that as the assembled seal is inflated the seal corner is forced into the corner at the end of the vertical plate and then spread to 90 degrees to fill the corner as the water inflating pressure is increased and line contact effected.

It can thus be seen from the foregoing description that a novel sealing device is disclosed that will provide adequate sealing between two relatively movable surfaces, particularly when high temperatures are involved.

Obviously many modifications and variations of the present invention are possible in the light of the above teachings. It is therefore to be understood that the invention may be practiced otherwise than as specifically described.

What is claimed is:

1. A pressure sealing device for sealing the joint between relatively movable walls comprising, a seal groove in one of said walls, a flexible hose substantially elliptical in cross-section mounted innermost within said seal groove, a labyrinth seal mounted within said seal groove and having a plurality of grooves therein, said labyrinth seal being in engaging contact with one of said walls thereby forming a plurality of passageways, fluid means for expanding said flexible hose, and means for supplying air under pressure to said passageways.

2. A pressure sealing device for sealing the joint between a movable wall and a stationary wall comprising, a seal groove in said movable wall, a flexible hose substantially elliptical in cross-section mounted innermost within said seal groove, a labyrinth seal having a plurality of grooves therein mounted within said seal groove and in engaging contact with said stationary wall thereby forming a plurality of passageways, liquid means for expanding and cooling said flexible hose, and means for supplying air under pressure to at least one of said passageways.

3. A pressure sealing device as set forth in claim 2 wherein means for supplying air under pressure to at least one of said passageways includes a hypodermic needle connecting said passageway and an air hose.

References Cited in the file of this patent

UNITED STATES PATENTS

| | | |
|---|---|---|
| 1,633,121 | Minton | June 21, 1927 |
| 2,591,129 | Brouwer | Apr. 1, 1952 |